March 30, 1965  R. L. ARBAUGH  3,175,846

TRAILER HITCH

Filed May 28, 1963

INVENTOR.
ROBERT L. ARBAUGH
BY
*Isler & Ornstein*
ATTORNEYS 3,175,846
TRAILER HITCH
Robert L. Arbaugh, Elkton, Md.
(200 Murray Road, Newark, Del.)
Filed May 28, 1963, Ser. No. 283,757
3 Claims. (Cl. 280—490)

This invention relates generally to trailer hitches, but has reference more particularly to a hitch which is especially adapted for securing a trailer frame to the rear end of a truck frame.

A primary object of the invention is to provide a trailer hitch of the character described, in which means are provided for adjustment of parts of the hitch for the purpose of properly aligning the trailer with the truck.

Another object of the invention is to provide a trailer hitch of the character described, in which the connections between the various parts of the trailer hitch and the connections between the hitch and the truck and trailer are so designed as to reduce stress and strain between the parts and connections to a minimum.

A further object of the invention is to provide a trailer hitch of the character described, having novel features of adjustment.

Other objects and advantages of my invention will be apparent during the course of the following description.

In the accompanying drawings forming a part of this specification, and in which like numerals are employed to designate like parts throughout the same, FIG. 1 is a fragmentary side elevational view of the trailer hitch, with portions broken away to better illustrate certain parts;

Figure 1:
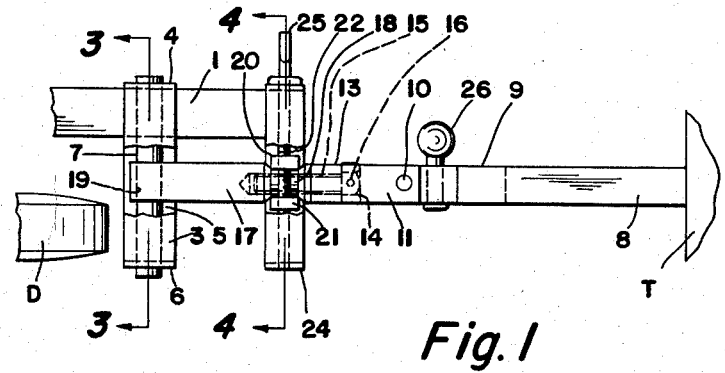
Figure 2:
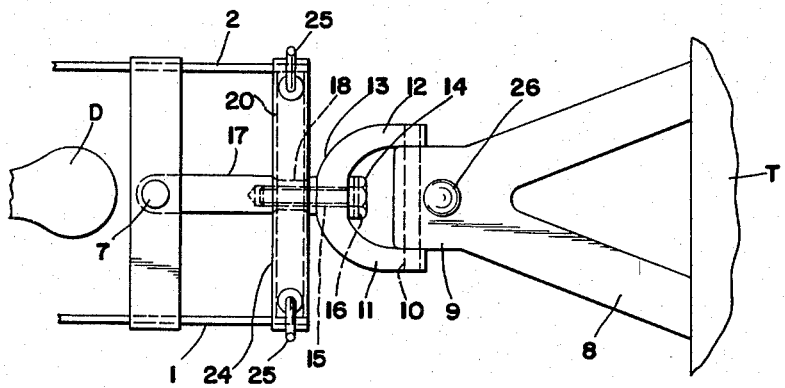
FIG. 2 is a fragmentary plan view of the trailer hitch.
Figure 3:
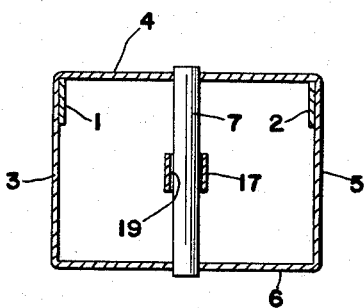
FIG. 3 is a cross-sectional view, taken on the line 3—3 of FIG. 1.
Figure 4:
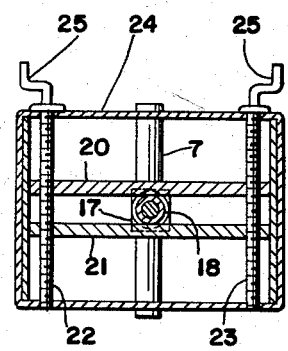
FIG. 4 is a cross-sectional view, taken on the line 4—4 of FIG. 1.

Referring more particularly to the drawings, reference numerals 1 and 2 designate the transversely spaced structural members of a truck frame, to which bracing members 4, 5 and 6 are secured adjacent the rear end of the frame.

Secured in the bracing members 4 and 6 is a vertical pin 7, which serves a purpose to be presently described.

Reference numeral 8 designates a frame of generally A-shaped form, which is adapted to be rigidly secured, as by bolts or clamps (not shown) to a trailer frame T, which may be the frame of a house trailer.

The frame 8 is provided with an extension 9, which is pivotally secured, as by a horizontal pin 10, to the arms 11 and 12 of a yoke 13.

The yoke 13 has secured therein, as by a nut 14, a member 15 which is rotatable in the yoke 13 about its own axis. The member 15 is locked in the yoke against longitudinal displacement therefrom by the nut 14, a lock pin 16 extending through the nut and member 15.

The member 15 carries at its forward end a link 17, on which is mounted a roller bearing 18. The link 17 is provided at its forward end with an opening 19, through which the pin 7 extends, so that the link 17 is movable axially of the pin 7.

The roller bearing 18 is clamped between a pair of vertically-spaced bars 20 and 21, which bars are movable vertically in unison to any adjusted position, this being accomplished by means of screws 22 and 23, which are mounted in a frame 24, which is rigidly mounted on the rear end of the truck frame.

The screws 22 and 23 are manipulable or rotatable in the frame 24 by means of crank handles 25 secured to the upper ends of the screws.

By rotating the screws 22 and 23, the position of the roller bearing 18 may be adjusted vertically, the purpose of this adjustment being to adjust the trailer frame to a horizontal or level position, where the trailer is not level with the truck frame. The arrangement or mounting of the roller bearing 18 also permits some lateral adjustment or movement of the yoke 13, where this is necessary to properly align the trailer frame with the truck or truck frame.

The frame 8 is also provided with the usual or conventional ball retainer 26, which is normally used to connect a trailer with a truck, so that actually, the trailer has a double connection to the truck frame.

It may be noted that the connection of the link 17 to the pin 7 is near the differential D of the truck.

Instead of connecting the link 17 to the truck by a pin 7, a ball-joint connection may be used at this point.

The trailer hitch, as thus described, is highly efficient and positive, and is so constructed and connected to the truck and trailer frame as to cause a minimum of stress and strain between the truck and frame. Such stress and strain is further relieved by the adjustability of the various connections, as described.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In combination, a truck having an elongated vertical pin mounted thereon adjacent the rear of the truck, a trailer frame, means for pivotally connecting said trailer frame to said pin, said means comprising a yoke pivotally secured to said frame for pivotal movement about a horizontal axis, a member extending through said yoke normal to said axis and rotatable in the yoke about its own axis, a link carried by said member, said link pivoted at its rear end to said pin and said rear end being vertically slidable relatively to said pin, and means for adjusting said link vertically, said last-named means comprising a pair of vertically-spaced bars between which said link extends, and horizontally-spaced, vertically-extending screws on said truck for moving said bars in unison and thereby adjusting the position of said link to align said trailer frame with said truck.

2. The combination, as defined in claim 1, in which said screws are mounted in a frame which is rigidly mounted on the rear end of said truck.

3. The combination, as defined in claim 2, in which a roller bearing is mounted on said link between the link and said bars, said bearing facilitating horizontal pivotal movement of said link about said pin.

References Cited by the Examiner

UNITED STATES PATENTS

| 2,780,479 | 2/57 | Frieberg | 280—499 X |
| 2,940,775 | 6/60 | Farrow et al. | 280—415 |
| 2,947,551 | 8/60 | Reimers | 280—499 |
| 3,018,117 | 1/62 | Bechard | 280—490 |

FOREIGN PATENTS

| 833,148 | 4/60 | Great Britain. |

A. HARRY LEVY, *Primary Examiner.*

LEO FRIAGLIA, *Examiner.*